US011720368B2

(12) United States Patent
Myrick et al.

(10) Patent No.: US 11,720,368 B2
(45) Date of Patent: Aug. 8, 2023

(54) MEMORY MANAGEMENT OF DATA PROCESSING SYSTEMS

(71) Applicant: Apple Inc., Cupertino, CA (US)

(72) Inventors: Andrew D. Myrick, San Francisco, CA (US); David M. Chan, Palo Alto, CA (US); Jonathan R. Reeves, San Francisco, CA (US); Jeffrey D. Curless, San Jose, CA (US); Lionel D. Desai, San Francisco, CA (US); James C. McIlree, San Jose, CA (US); Karen A. Crippes, San Jose, CA (US); Rasha Eqbal, Union City, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/194,600

(22) Filed: Mar. 8, 2021

(65) Prior Publication Data

US 2021/0191734 A1    Jun. 24, 2021

Related U.S. Application Data

(62) Division of application No. 15/962,298, filed on Apr. 25, 2018, now Pat. No. 10,956,172, which is a (Continued)

(51) Int. Cl.
*G06F 9/4401* (2018.01)
*G06F 3/06* (2006.01)
(Continued)

(52) U.S. Cl.
CPC .......... *G06F 9/4406* (2013.01); *G06F 3/0608* (2013.01); *G06F 3/0653* (2013.01);
(Continued)

(58) Field of Classification Search
CPC .................................... G06F 3/06; G06F 9/44
See application file for complete search history.

(56) References Cited

U.S. PATENT DOCUMENTS

| 6,938,257 B1 | 8/2005 | Rapp |
| 6,981,048 B1 | 12/2005 | Abdolbaghian |

(Continued)

FOREIGN PATENT DOCUMENTS

CN          104050044 A       9/2014

OTHER PUBLICATIONS

PCT/US2016/025054, International Search Report and Written Opinion, dated Jul. 4, 2016, 13 pages.
(Continued)

*Primary Examiner* — Phil K Nguyen
(74) *Attorney, Agent, or Firm* — Womble Bond Dickinson (US) LLP

(57) ABSTRACT

Techniques for memory management of a data processing system are described herein. According to one embodiment, a memory usage monitor executed by a processor of a data processing system monitors memory usages of groups of programs running within a memory of the data processing system. In response to determining that a first memory usage of a first group of the programs exceeds a first predetermined threshold, a user level reboot is performed in which one or more applications running within a user space of an operating system of the data processing system are terminated and relaunched. In response to determining that a second memory usage of a second group of the programs exceeds a second predetermined threshold, a system level reboot is performed in which one or more system components running within a kernel space of the operating system are terminated and relaunched.

13 Claims, 12 Drawing Sheets

Related U.S. Application Data division of application No. 14/973,371, filed on Dec. 17, 2015, now Pat. No. 9,983,887.

(60) Provisional application No. 62/171,821, filed on Jun. 5, 2015.

(51) Int. Cl.
*G06F 9/50* (2006.01)
*G06F 11/14* (2006.01)
*G06F 9/48* (2006.01)

(52) U.S. Cl.
CPC .......... *G06F 3/0673* (2013.01); *G06F 9/4401* (2013.01); *G06F 9/442* (2013.01); *G06F 9/485* (2013.01); *G06F 9/5016* (2013.01); *G06F 11/1438* (2013.01)

(56) References Cited

U.S. PATENT DOCUMENTS

| | | |
|---|---|---|
| 7,991,961 B1 | 8/2011 | Tsai |
| 8,082,414 B2 | 12/2011 | Vitanov et al. |
| 8,635,630 B2 | 1/2014 | Iyer et al. |
| 2005/0076184 A1 | 4/2005 | Schumacher |
| 2005/0095427 A1 | 5/2005 | Chang et al. |
| 2006/0095427 A1* | 5/2006 | Dickenson ............ G06F 11/362 |
| 2007/0033365 A1 | 2/2007 | Vaidyanathan et al. |
| 2007/0112625 A1 | 5/2007 | Gonzales |
| 2008/0133842 A1 | 6/2008 | Raikin |
| 2008/0168235 A1* | 7/2008 | Watson .................. G06F 9/485 711/135 |
| 2008/0301504 A1* | 12/2008 | Chen .................... G06F 11/008 714/42 |
| 2009/0295814 A1 | 12/2009 | Matsusaka |
| 2010/0031238 A1* | 2/2010 | Li ....................... G06F 11/3604 717/124 |
| 2012/0210110 A1 | 8/2012 | Akiyoshi |
| 2012/0324196 A1 | 12/2012 | Maillet et al. |
| 2013/0047039 A1* | 2/2013 | Manes ............... G06F 11/3466 714/47.1 |
| 2013/0047198 A1 | 2/2013 | Srour |
| 2013/0160011 A1 | 6/2013 | Corrie |
| 2013/0209065 A1* | 8/2013 | Yeung ............... H04N 21/4622 386/248 |
| 2013/0326168 A1 | 12/2013 | Chang et al. |
| 2014/0059571 A1 | 2/2014 | Watson et al. |
| 2014/0123151 A1* | 5/2014 | Kishan .................. G06F 9/4881 718/103 |
| 2014/0359111 A1 | 12/2014 | Hilmo |
| 2015/0081978 A1* | 3/2015 | Daly ...................... G06F 12/12 711/133 |
| 2015/0127819 A1* | 5/2015 | Cimino ................ H04L 67/125 709/224 |
| 2015/0256476 A1* | 9/2015 | Kurtzman ............ G06F 9/5016 709/226 |
| 2015/0346933 A1* | 12/2015 | Vyas ....................... G06F 1/28 715/772 |
| 2015/0347262 A1* | 12/2015 | Vyas .................... G06F 9/5022 718/104 |
| 2015/0377506 A1 | 12/2015 | Sakaguchi |
| 2016/0283366 A1 | 9/2016 | Nguyen |

OTHER PUBLICATIONS

PCT/US2016/025054, International Preliminary Report on Patentabilty, dated Dec. 5, 2017, 9 pages.

* cited by examiner

| Conditions | Memory Management Actions |
|---|---|
| Memory usage of a first group of components > threshold 1 | User space reboot |
| Memory usage of second group of components > threshold 2 | System level reboot |
| Some predefined conditions | Force some applications to be inactive |
| Some predefined conditions | Reset or relaunch some components (e.g., program launch daemon, i.e., springboard) |
| ... | ... |

MEMORY MANAGEMENT OF DATA PROCESSING SYSTEMS

RELATED APPLICATIONS

This application is a divisional application of U.S. application Ser. No. 15/962,298 filed Apr. 25, 2018, which is a divisional application of U.S. application Ser. No. 14/973,371 filed Dec. 17, 2015, now issued as U.S. Pat. No. 9,983,887, which claims the benefit of U.S. provisional patent application No. 62/171,821, filed Jun. 5, 2015, which is incorporated by reference in its entirety.

FIELD OF THE INVENTION

Embodiments of the present invention relate generally to data processing systems. More particularly, embodiments of the invention relate to resource management of a data processing system.

BACKGROUND

An operating system (OS), such as iOS™ or OS X™ from Apple Inc®. or Microsoft Windows™ from Microsoft®, is a collection of software that manages device hardware resources and provides common services for computer programs such as application software. Application software can be considered to be the computer program that causes a computer or other data processing system to perform useful tasks in response to user requests or other requests or other inputs. A specific instance of application software is called a software application, application program, application or app, which are used interchangeably herein. Application programs usually require an operating system to function.

As more and more apps and services are becoming available for small or mobile devices (e.g., a smartphone), the number of applications running at the same time in a single device has increased significantly. Moreover, many of these applications are not terminated or quit by a user after a user finishes using them so they continue to run and therefore continue to use system resources such as memory (e.g. volatile memory such as DRAM) even when they are no longer being used. Furthermore, idle background and foreground applications, while they may not use processing or computation resources, such as one or more microprocessors, they often use memory resources such as RAM while they are idle and not in use. These multiple applications or processes in the same device compete with each other by sharing the same memory resources and computation resources embedded within a device, and the operating system performs resource management, such as memory management, to deal with resource contention in concurrent computing. Memory management to control use of memory by running or idle applications has included techniques to terminate applications based on one or more indications of use of memory (e.g. DRAM) in a data processing system.

BRIEF DESCRIPTION OF THE DRAWINGS

Embodiments of the invention are illustrated by way of example and not limitation in the figures of the accompanying drawings in which like references indicate similar elements.

FIG. 2 is a block diagram illustrating a data structure representing a set of memory management rules according to one embodiment of the invention.

DETAILED DESCRIPTION

Figure 1:
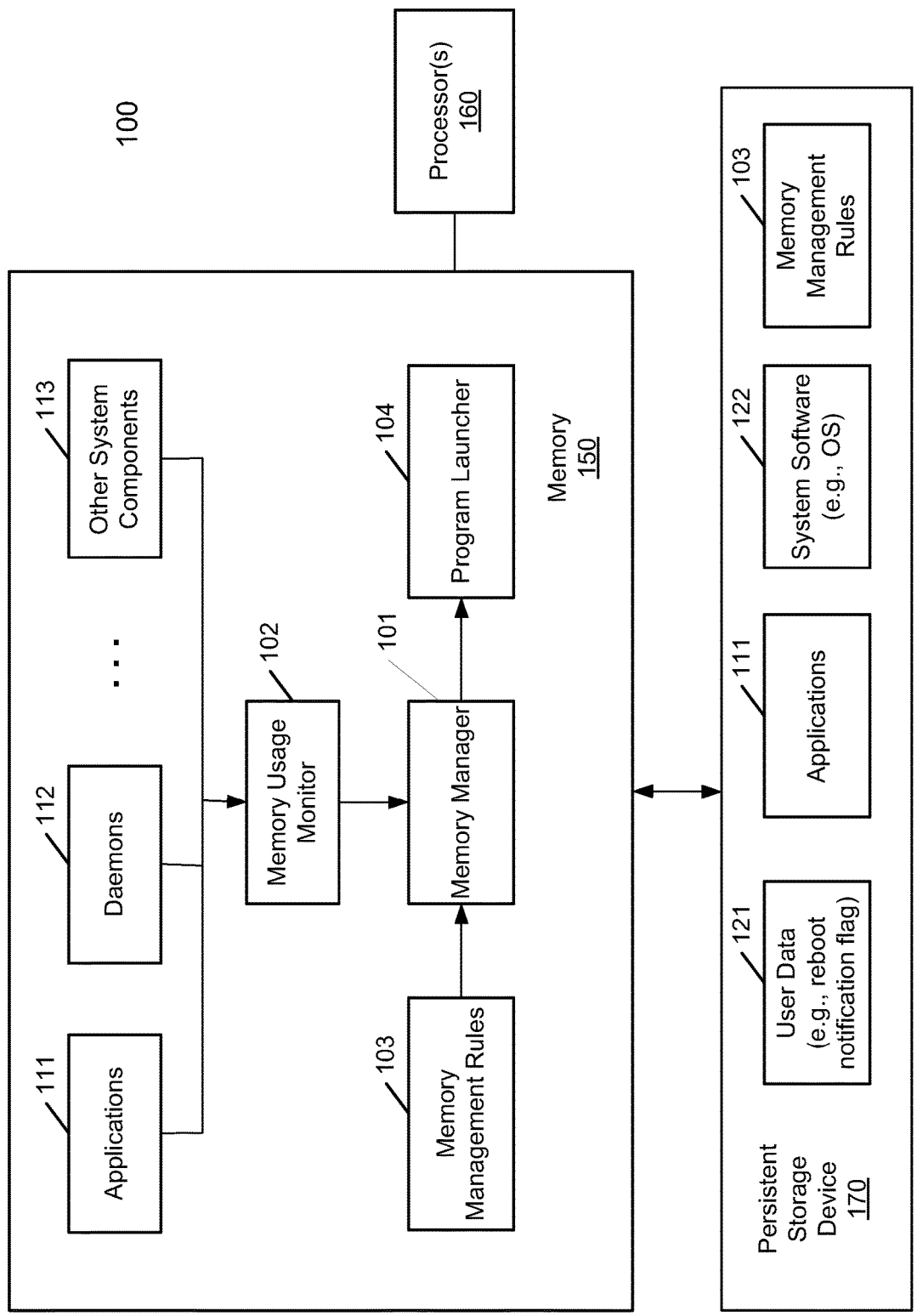
FIG. 1 is a block diagram illustrating a data processing system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, memory management of a data processing system is performed at multiple levels. In one embodiment, an overall memory usage of a predetermined set of programs (e.g., applications, daemons, system components of an operating system) is monitored. When the overall memory usage of the set of programs exceeds a first predetermined threshold, a first memory usage reduction action or operation is performed. When the overall memory usage of the set of programs exceeds a second predetermined threshold, a second memory usage reduction action or operation is performed. For example, when the overall memory usage of a set of one or more programs exceeds a first watermark, a user space reboot may be performed, in which user level programs may be terminated and relaunched. When the overall memory usage exceeds a second watermark (which may be higher than the first watermark), a system level reboot may be performed, in which the entire or a significant portion of programs running within a data processing system may be terminated and relaunched. The reboots may cause certain memory used by certain programs (e.g., memory leaks) to be released to reduce the overall memory usage. The reboots may be performed based on the overall memory usage of the predetermined set of programs, even though the individual memory usage of an individual one of the programs may not exceed its corresponding threshold.

According to another aspect of the invention, certain programs or components may be grouped into different groups. Each of the groups may be associated with a different memory usage threshold, which may be user configurable. Some of the programs or components in different groups may be overlapped, dependent upon the specific user configuration. The memory usage of these groups may be monitored in view of their respective memory usage thresholds. When a memory usage of a group of one or more programs or components exceeds its corresponding memory usage threshold, a preconfigured memory reduction action corresponding to that group may be performed. The memory reduction action may also be user configurable. The groups of programs or components may include a group of user level components, a group of kernel level components, and a group of system application level components. A memory reduction action may include a specific level of reboots such as user level reboot, system level reboot, and system application level reboot.

According to another aspect of the invention, the memory usages of individual programs are also monitored, where each of the programs is associated with multiple levels of memory usage thresholds dependent upon its operating state or operating status. In one embodiment, a memory usage and an operating state of each program are monitored by monitoring logic of an operating system. When a memory usage of a program exceeds a first predetermined threshold (e.g., high watermark) that is associated with the program and the program is in an active state, a first memory usage reduction action is performed on the program. When the memory usage of the program exceeds a second predetermined threshold (e.g., low watermark) associated with the program and the program is in an inactive state, a second memory usage reduction action is performed on the program.

According to a further aspect of the invention, the time of certain transactions (e.g., inter-process call (IPC) transaction such as an XPC™ transaction of iOS available from Apple Inc.) performed by a program is tracked. If a program initiates a predetermined type of transactions, a timer or a timer object may be used to track how long the program has been active with that transaction. If the time exceeds a predetermined threshold, a memory usage reduction action may be performed on the program, such as, for example, forcing the program to transition from an active state to an inactive state. Alternatively, the program may be terminated.

According to a further aspect of the invention, when a user of a data processing system is asleep, e.g., no user interaction with the system is detected for a period of time, the system examines whether there are some events that still consume unnecessary memory or other resources. If so, a memory reduction action may also be performed such as terminating any program that the user typically would not use when there is no user interaction detected. For example, if there is no user interaction detected for a predetermined period of time, an application launcher daemon may be terminated, since it is less likely the user would launch any program at the moment. Furthermore, when a maintenance action (e.g., reboot while the user is asleep) is performed, the system may examine one or more flags or one or more data members of one or more data structures stored at various storage locations to determine whether the flags have been set to a predetermined value, for example, by the user or by a manufacturer or distributor of the system. If the flags have been set to the predetermined value, the user may be notified that the maintenance action has been performed, for example, by displaying a message or sending a message to a user's inbox; otherwise, the user will not be notified. The flag may be set to the predetermined value so that the user will not be disrupted by the maintenance action, as the user may prefer not to know about the maintenance action.

FIG. 1 is a block diagram illustrating a memory management system of a data processing system according to one embodiment of the invention. Referring to FIG. 1, system 100 represents any kind of data processing systems, such as, for example, a server, a desktop (e.g., iMac™ available from Apple Inc®. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof.

In one embodiment, system 100 memory manager 101 and memory usage monitor 102 executed by processing resources (e.g., processor(s) 160). Processing resources may present one or more processors or processor cores. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

Memory manager 101 and memory usage monitor 102 may be a part of an operating system (OS) loaded in memory 150 (e.g., volatile or system memory) and executed by the processing resources within the system. An operating system is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service. In addition, an operating system may further include other core components, such as a scheduler, a device manager, a kernel, etc. In order not to unnecessarily obscure embodiments of the present invention, these components are not shown herein. An operating system may be any kind of operating systems, such as, for example, iOS™ or OS X™ from Apple®, Android™ from Google®, Windows™ from Microsoft®, or other operating systems (e.g., UNIX, LINUX, real-time or embedded operating systems).

In one embodiment, memory usage monitor 102 is configured to monitor memory usages of a variety of software programs loaded and running within memory 150, such as, for example, applications 111, daemons 112, and other system components 113 (e.g., kernel components) of the operating system. Applications 111 may be user applications that are downloaded and installed by a user of system 100 or alternatively, preloaded applications by a vendor or manufacturer of system 100 (e.g., system applications). Daemons 112 may be helper applications that are configured to help or coordinate communications between applications 111 and other system components 113 of the operating system.

According to one embodiment, each of applications or processes 111-113 (collectively referred to as programs hereafter) may be executed within a respective dedicated or isolated operating environment, such as a sandboxed environment as a separate process address space. A process address space refers to a virtual address space or address space that is the set of ranges of virtual addresses that an operating system makes available to a process. The range of virtual addresses usually starts at a low address and can extend to the highest address allowed by the computer's instruction set architecture. This provides several benefits, one of which is, if each process is given a separate address space, security through process isolation.

In one embodiment, based on the memory usages monitored by memory monitor 102, memory manager 101 performs a resource management action such as a memory usage reduction action on any of applications 111, daemons 112, and system components 113 based on a set of memory management rules 103, which defines certain actions to be taken in response to certain conditions (e.g., memory usage levels) as shown in FIG. 2. For example, if it is determined that the memory usage of any or all of applications 111, daemons 112, and system components 113 exceeds a certain level, based on memory management rules 103, memory manager 101 may cause program launcher 104 or other logic to terminate a specific program or to reboot the system (e.g., user space reboot and/or system level reboot).

In addition, system 100 further includes a persistent storage device 170 (e.g., hard disk or other non-volatile storage devices) to store user data 121, applications 111, system software 122 (e.g., operating system), and memory management rules 103. Any of applications 111 and system software 122 can be loaded into memory 150 and executed by processor(s) 160. A user can store any user data, such as email files, user files, as well as other user or system settings of system 100 (e.g., reboot notification flag(s)).

According to one embodiment of the invention, memory usage monitor 102 monitors an overall memory usage of a set of predetermined programs, in this example, applications 111, daemons 112, and system components 113. When the overall memory usage of the set of programs exceeds a first predetermined threshold, memory manager 101 performs a first memory usage reduction action based on memory management rules 103. When the overall memory usage of the set of programs exceeds a second predetermined threshold, a second memory usage reduction action is performed based on memory management rules 103.

For example, based on memory management rules 103 as shown as an example in FIG. 2, when the overall memory usage exceeds a first watermark, memory manager 101 may instructs program launcher 104 or other reboot logic to perform a user level reboot. When the overall memory usage exceeds a second watermark (which may be higher than the first watermark), memory manager 101 may instructs program launcher 104 or other reboot logic to perform a system level reboot. A user level reboot refers to a reboot in which only certain programs running within a user space of an operating system may be terminated and reloaded, while programs running within a kernel space of the operating system may not be terminated and launched. A system level reboot refers to a reboot in which most of the programs, including those running within the user space and kernel space, may be terminated and reloaded. A reboot may cause certain memory used or occupied by certain programs (e.g., memory leaks) to be released to reduce the overall memory usage. The reboots may be performed based on the overall memory usage of the predetermined set of programs, even though the individual memory usage of an individual one of the programs may not exceed a specific memory usage threshold that is associated with the specific program.

According to one embodiment, dependent upon memory management rules 103, a diagnostic report may also be generated and transmitted to a predetermined destination (e.g., a remote data collection server). The diagnostic report may include information collected from at least some of the programs concerning their memory usages, for example, for debugging or diagnostic purposes.

According to another embodiment, the reboots may be configured in at least two stages. When the overall memory usage exceeds the first predetermined threshold, a user level/space reboot is performed. After the user space reboot is performed, memory monitor 102 measures the overall kernel memory usage of at least the kernel components of the operating system to determine whether the overall kernel memory usage exceeds a third predetermined threshold. If so, the system reboot is then performed accordingly.

According to one embodiment of the invention, certain programs or components may be grouped into different groups. Each of the groups may be associated with a different memory usage threshold, which may be user configurable and stored as part of memory management rules 103. Some of the programs or components in different groups may be overlapped, dependent upon the specific user configuration. The memory usage of these groups may be monitored by memory usage monitor 102 in view of their respective memory usage thresholds. When a memory usage of a group of one or more programs or components exceeds its corresponding memory usage threshold, memory manager 101 performs a preconfigured memory reduction action corresponding to that group. The memory reduction action may also be user configurable. The groups of programs or components may include a group of user level components, a group of kernel level components, and a group of system application level components. Alternatively, a user can configure a group that may include a user program, kernel level component, and/or a system application. A memory reduction action may include a specific level of reboots such as user level reboot, system level reboot, and system application level reboot.

A user program refers to a program that is installed by a user. A system application refers to an application or program that authorized and signed by a provider of an operating system. For example, a system application may be an application that is bundled and shipped with the operating system. Typically, a user application and a system application are running within a user space of an operating system. A kernel level component refers to a software component that is running within a kernel space of the operating system, such as daemons. Amongst the user space programs, some may be associated with a higher memory usage threshold than others (e.g., foreground applications). According to one embodiment, each system daemon may have its own memory usage threshold.

According to one embodiment, when the memory usage of a first group (e.g., a group of user level components) exceeds a first predetermined threshold (e.g., a user level threshold), memory manager 101 causes a first predetermined memory reduction action (e.g., a user level reboot) to be performed. When the memory usage of a second group (e.g., a group of kernel level components) exceeds a second predetermined threshold (e.g., a kernel level threshold), memory manager 101 causes a second predetermined memory reduction action (e.g., a system level reboot) to be performed.

According to another embodiment, a reboot, either a user space reboot or a system level reboot, may be performed only if there is no user interaction with system 100 for a predetermined period of time (e.g., asleep). In some situations, dependent upon the specific configuration of memory management rules 103, instead of rebooting, if there is no user interaction for a while, program launcher or daemon 104 (e.g., Springboard) may be terminated. The rationale behind it is that since the user is asleep, there is no program to be launched for a while and thus there is no need for program launcher 104 to be running. That is, the system may perform any necessary memory reduction actions in an attempt to reduce the overall memory usage of the programs. Only if the overall memory usage is still too high, the reboot(s) may then be performed.

Figure 3A:
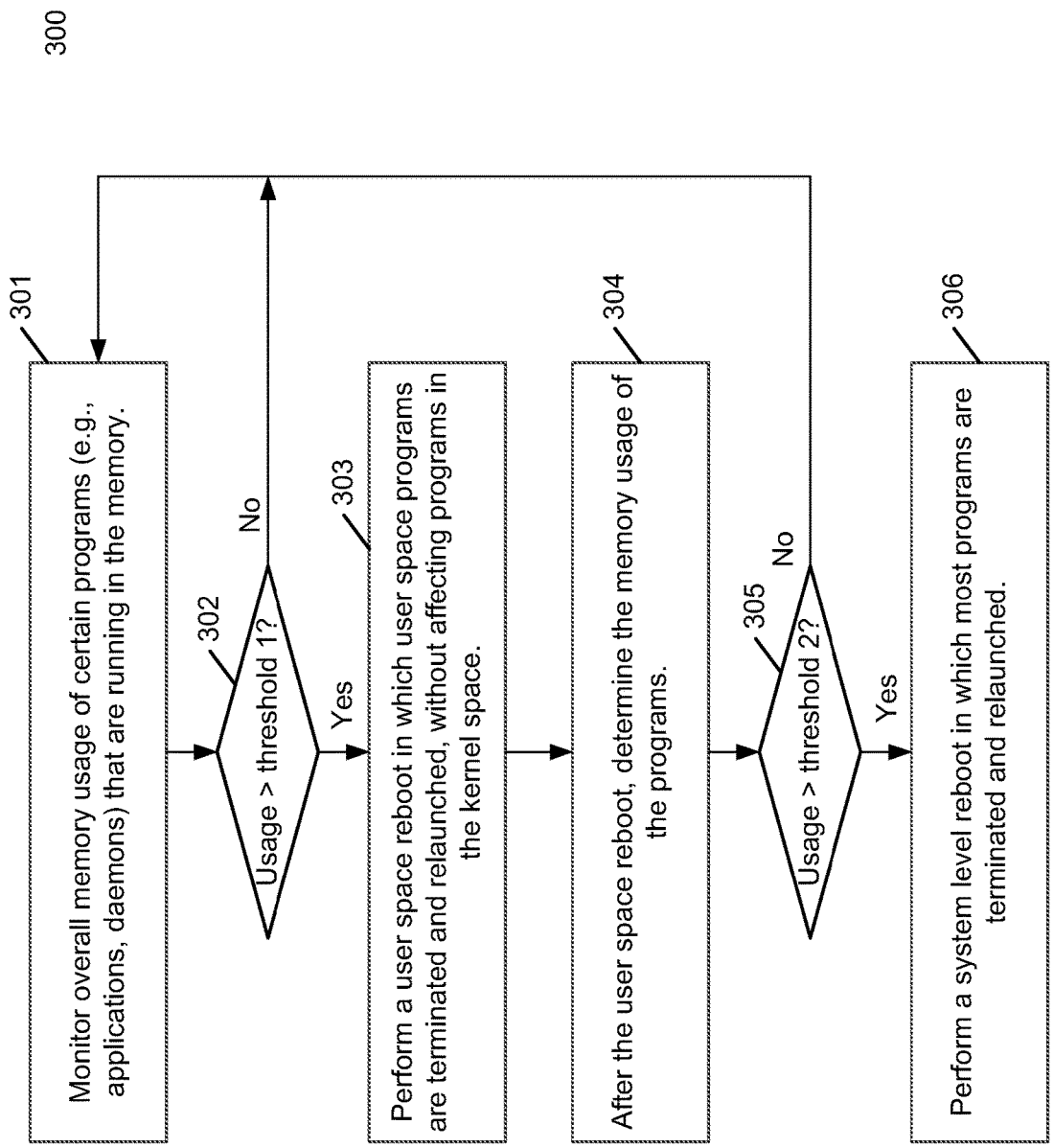
FIG. 3A-3C are flow diagrams illustrating a process for memory management of a data processing system according to certain embodiments of the invention.

FIG. 3A is a flow diagram illustrating a process for memory management of a data processing system according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by memory manager 101 and/or memory monitor 102 of FIG. 1. Referring to FIG. 3A, at block 301, processing logic monitors the overall memory usage of a predetermined set of programs (e.g., applications, daemons, system components) that are running in the system memory of a data processing system. At block 302, it is determined whether the overall memory usage exceeds a first predetermined threshold. If so, at block 302, processing logic performs a user space reboot, in which at least some programs that are running within a user space of an operating system are terminated and reloaded, without having to terminating and reload a program running in a kernel space of the operating system. After the user space reboot, at block 304, processing logic determines overall memory usage of the programs or only some kernel space programs. If the overall memory usage exceeds a second predetermined threshold at block 305, processing logic performs a system level reboot at block 306, in which most of the programs will be terminated and reloaded.

Note that in the embodiment as shown in FIG. 3A, the system level reboot is performed only if the overall memory usage is still too high after the user space reboot. According to another embodiment, the system level reboot or the user space reboot may be performed dependent upon the specific overall memory usage at the point in time. For example, if the overall memory usage is above a high watermark, the system level reboot may be performed without performing the user space reboot. If the overall memory usage is above a low watermark but below the high watermark, the user space reboot is then performed.

Figure 3B:
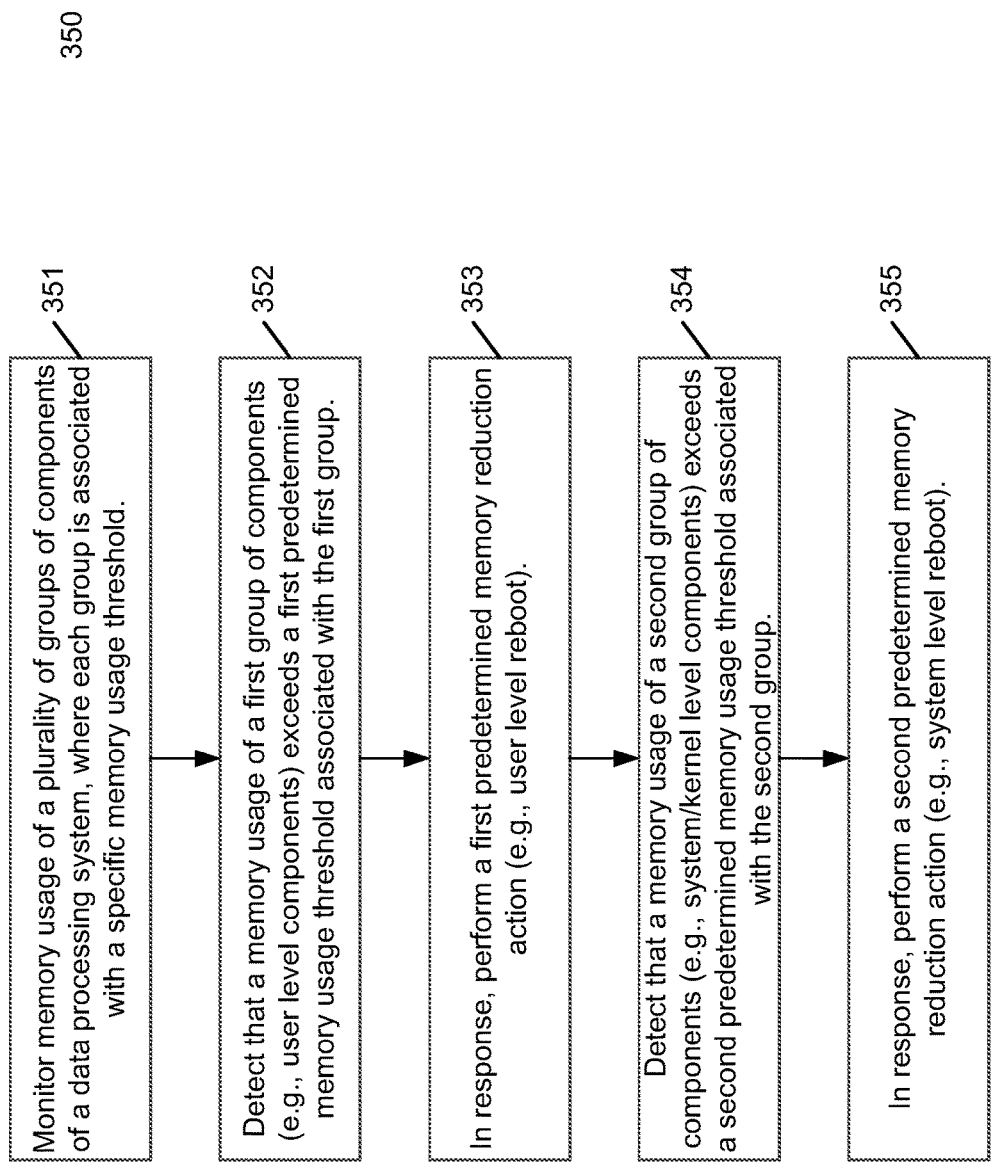

FIG. 3B is a flow diagram illustrating a process for memory management of a data processing system according to alternative embodiment of the invention. Process 350 may be performed by processing logic that includes hardware (e.g. circuitry, dedicated logic, etc.), software (e.g., embodied on a non-transitory computer readable medium), or a combination thereof. For example, process 350 may be performed by memory manager 101 and/or memory monitor 102 of FIG. 1. Referring to FIG. 3B, at block 351, processing logic monitors memory usages of groups of components of a data processing system. Each group is associated with a specific memory usage threshold. At block 352, processing logic detects that a memory usage of a first group of components (e.g., user level components) exceeds a first predetermined memory usage threshold corresponding to the first group. In response, at block 353, processing logic causes a first predetermined memory reduction action (e.g., user level reboot) to be performed. At block 354, processing logic detects that a memory usage of a second group of components (e.g., system or kernel level components) exceeds a second predetermined memory usage threshold corresponding to the second group. In response, at block 355, processing logic causes a second predetermined memory reduction action (e.g., system level reboot) to be performed.

Figure 3C:
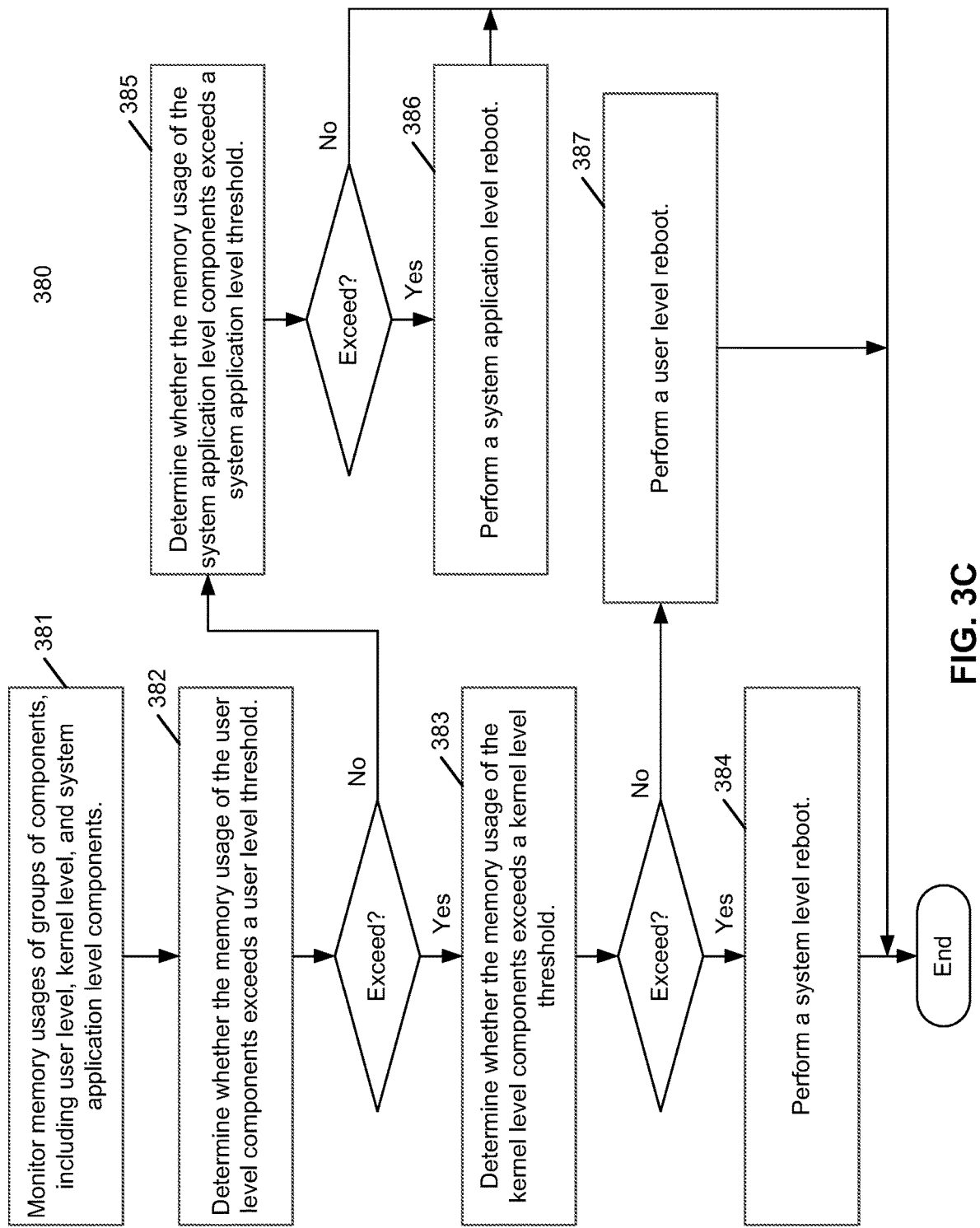

FIG. 3C is a flow diagram illustrating a process for memory management of a data processing system according to another embodiment of the invention. Process 380 may be performed by processing logic that includes hardware (e.g. circuitry, dedicated logic, etc.), software (e.g., embodied on a non-transitory computer readable medium), or a combination thereof. For example, process 380 may be performed by memory manager 101 and/or memory monitor 102 of FIG. 1. Referring to FIG. 3C, at block 381, processing logic monitors memory usages of groups of components of a data processing system, including user level components, kernel level components, and system application components. At block 382, processing logic determines whether the memory usage of the user level components exceeds a user level threshold. If so, at block 383, processing logic determines whether the memory usage of the kernel level components exceeds a kernel level threshold. If so, at block 384, processing logic causes the data processing system to perform a system level reboot. During the system level reboot, all of the components such as hardware and the kernel of an operating system may be reset.

If it is determined at block 383 that the memory usage of the kernel level components does not exceed the kernel level threshold, processing logic causes the data processing system to perform a user level reboot at block 387. During the user level reboot, all user space applications or processes may be restarted. If it is determined at block 382 that the memory usage of the user level components does not exceed the user level threshold, processing logic determines whether the memory usage of the system application components exceeds a system application level threshold at block 385. If so, at block 386, processing logic causes the data processing system to perform a system application level reboot, in which the system applications will be terminated and relaunched. In one embodiment, during the system application reboot, all of the user applications and the system main processes running at the user space (e.g., launch module) may be restarted.

In addition to the memory management based on an overall memory usage of a set of programs, a memory management function is also performed based on an individual memory usage of an individual program. Some of the programs may be associated with or assigned with multiple memory usage thresholds corresponding to different operating states, statuses, events, or conditions. When an application operates in a certain state and its memory usage satisfies a certain threshold corresponding to that state, a memory usage reduction action corresponding to that state and/or threshold is performed.

Figure 4:
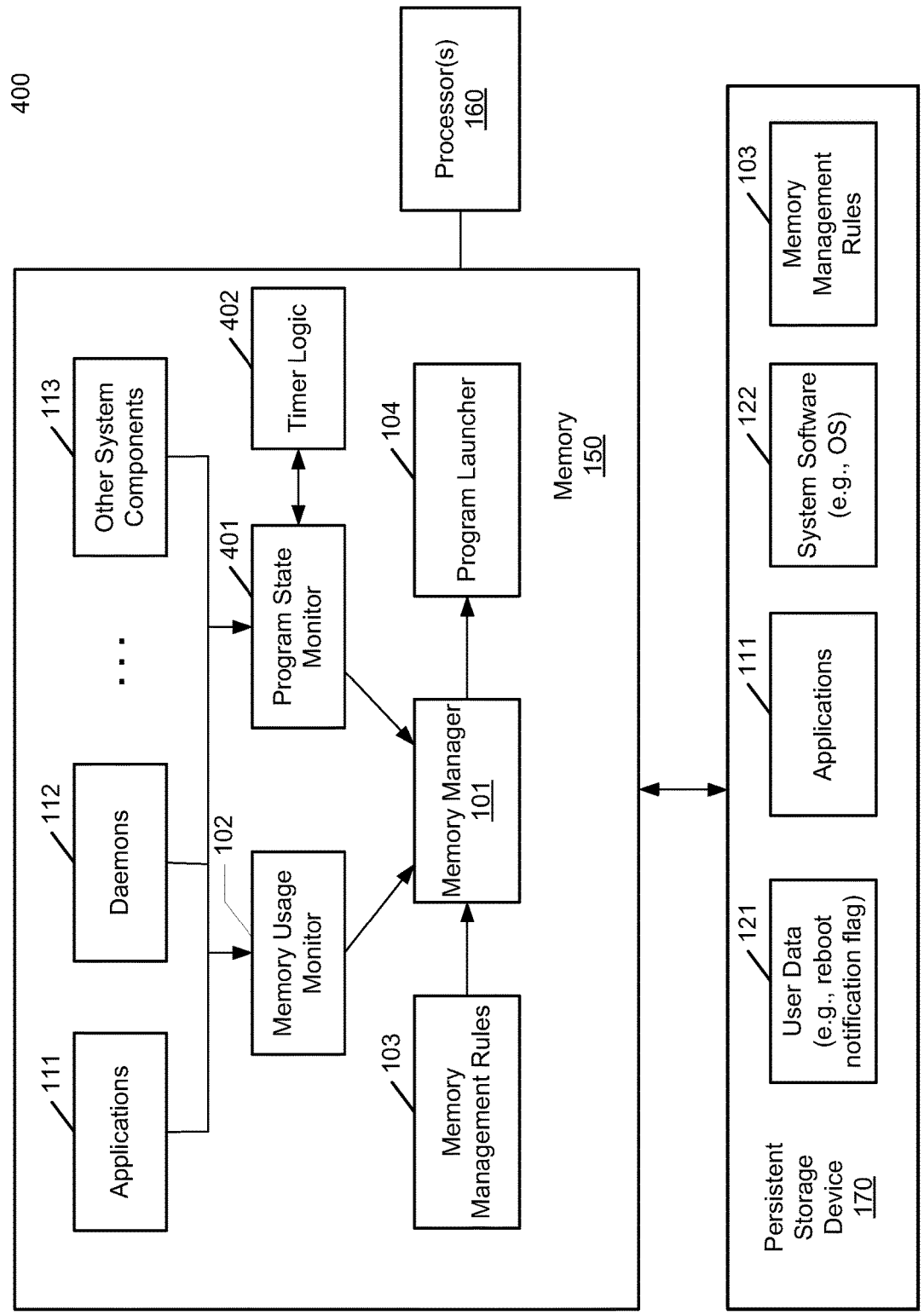
FIG. 4 is a block diagram illustrating a memory management system of a data processing system according to another embodiment of the invention.

FIG. 4 is a block diagram illustrating a memory management system of a data processing system according to another embodiment of the invention. Referring to FIG. 4, similar to system 100 of FIG. 1, system 400 includes memory usage monitor 102 (which is loaded in memory 150 and executed by processor(s) 160) to monitor memory usages of applications 111, daemons 112, and system components 113. In response to the memory usage data provided by memory monitor 102, memory manager 101 performs a certain memory management action based on memory management rules 103, as described above.

In addition, according to one embodiment, system 400 includes a program state monitor 401 loaded in memory 150 and executed by processor(s) 160 to monitor operating states of programs 111-113. In one embodiment, program state monitor 401 can determine whether a particular program is active or inactive based on the activities of the program. For example, if a program opens a communication session with another component (e.g., IPC or XPC communication session), the program is considered as active. In another example, if a program operates in a foreground, it may be considered as active; otherwise, it may be considered as inactive. Whether a program is considered as active vs. inactive under certain circumstances may be determined based on the type, role, or access privilege of the program. One program may be considered active while another program may be considered inactive under the same circumstances, dependent upon memory management rules 103 associated with the individual programs. The memory management rules 103 of a program may be configured by an administrator of the data processing system or alternatively, they may be automatically generated based on metadata or profile of the program (e.g., resource entitlement and/or resource budget), when the program is installed or launched.

According to one embodiment of the invention, memory usage monitor 102 monitors a memory usage of an individual program (e.g., daemon 112). Program state monitor 401 monitors an operating state of the program. Based on the data received from memory usage monitor 102 and program state monitor 401, when the memory usage of the program exceeds a first predetermined threshold (e.g., high watermark) that is associated with the program and the program is in an active state, memory manager 101 performs a first memory usage reduction action on the program. When the memory usage of the program exceeds a second predetermined threshold (e.g., low watermark) associated with the program and the program is in an inactive state, a second memory usage reduction action is performed on the program.

Figure 5A:
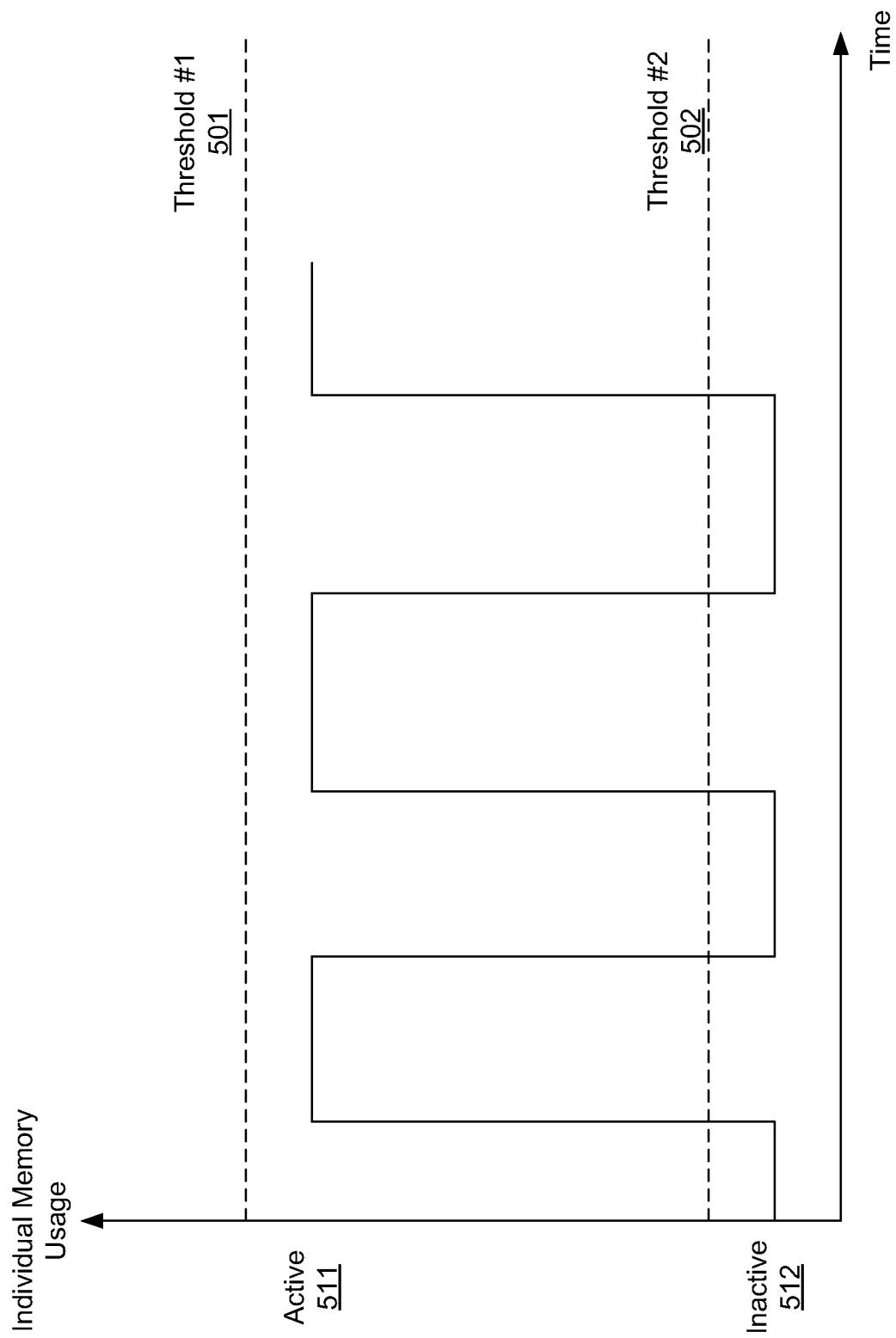
FIGS. 5A and 5B are diagrams illustrating individual memory usages of programs according to one embodiment of the invention.

When a program operates in an active state, in general, it consumes more memory. Likewise, when the program operates in an inactive state, it consumes less memory. By maintaining a high watermark and a low watermark, memory manager 101 can determine whether there is a memory leak of the program early on. FIG. 5A shows a typical memory usage of a program according one embodiment of the invention. Referring to FIG. 5A, when the program is in an active state 511, its memory usage is usually higher. When the program is in an inactive state 512, its memory usage is usually lower. In this example, this program has been associated with assigned with a first threshold 501 as a high watermark and a second threshold 502 as a low watermark. During a normal operation, the memory usage of the program should be below threshold 501 when it is in an active state 511. Likewise, the memory usage of the program should be below threshold 502 when it is in an inactive state 512.

If the memory usage of the program is above threshold 501 while in an active state, a first memory usage reduction action is performed. Similarly, when the memory usage of the program is above threshold 502 while in an inactive state, a second memory usage reduction action is performed.

Figure 5B:
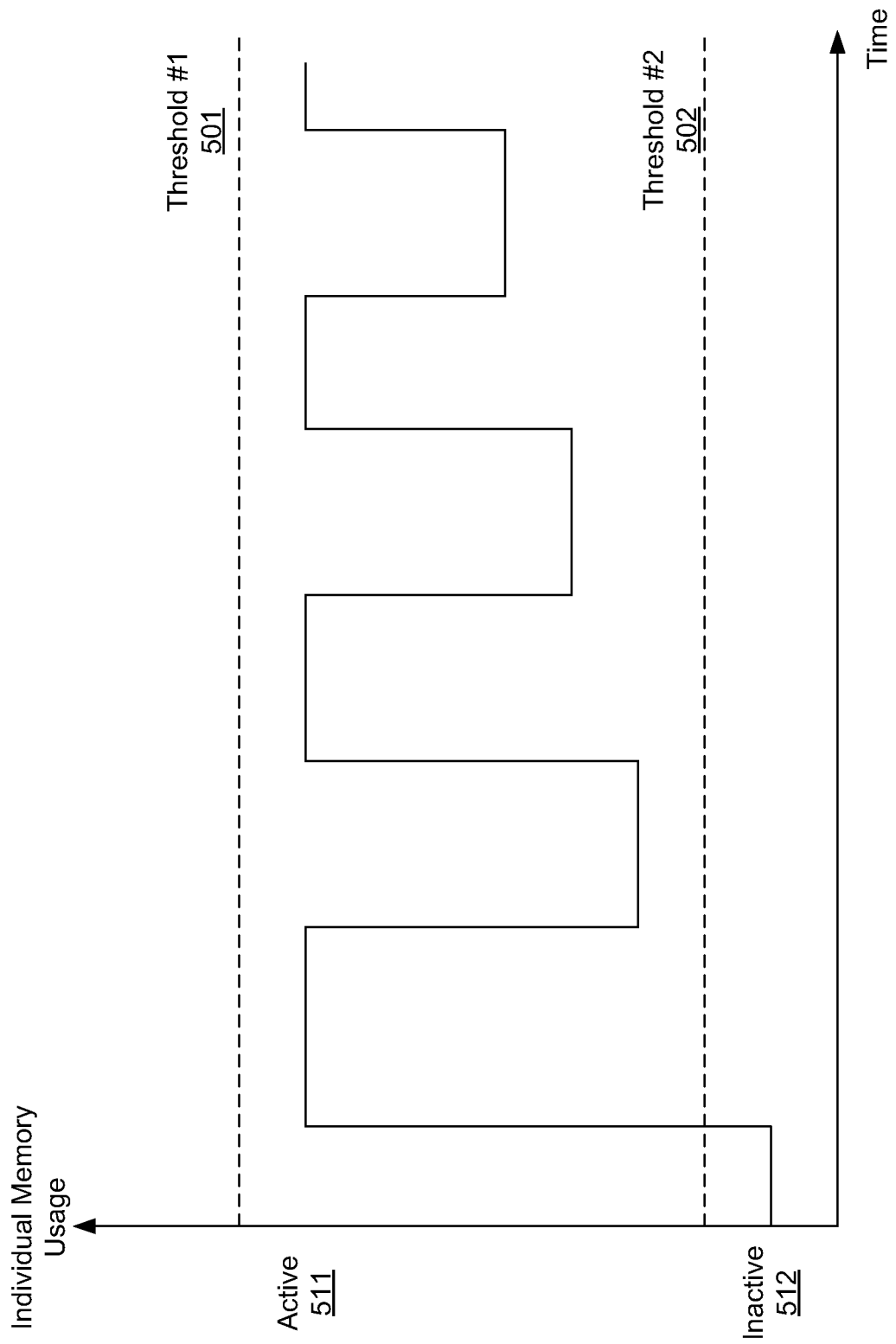

The first and second memory usage reduction actions may be the same or different dependent upon the specific configuration, such as memory management rules 103. By monitoring the memory usage of a program in view of the high watermark and low watermark, a potential memory leak may be detected before more damage to an operating system occurs. As shown in FIG. 5B, the memory usage of a program while it is inactive is trending higher and exceeding threshold 502. This may indicate that the program may have a memory leak and a memory usage reduction action should be performed before it causes further damage to the system.

A memory usage reduction action can be a variety of actions. For example, memory manager 101 may force the program to transition from an active state to an inactive state to reduce memory usage. The program may be terminated and reloaded. Memory manager 101 may also communicate with the program via an API to modify a functionality or behavior of the program to consume less memory. Memory manager 101 may disassociate or terminate a helper process or an extension associated with the program without or before terminating the program.

As described above, the memory management can be performed based on an overall memory usage of programs at a global level and at an individual program level. In one embodiment, the memory management can also performed on a coalition of programs or processes level. The total or overall memory usage of all programs in a coalition is monitored and a memory usage reduction operation is performed if the total memory usage of the coalition exceeds a certain threshold. A coalition of programs refers to a group or bundle of programs that are related or communicating with each other for a particular purpose or event.

A coalition of programs includes at least one host program and one or more other associated programs, such as a helper process, an extension, a library, etc. The host program can launch or cause a second program to be launched, where the second program will be added to the coalition. For example, a host program may be a Web browser which can launch a social network application. The social network application may further include an extension to help the browser to create a post in the corresponding social network. These programs are considered as part of the coalition. The total memory usage of all of these components in the coalition is monitored. When the total memory usage of a coalition exceeds a predetermined threshold, a memory usage reduction operation is performed on the programs of the coalition. Some programs within the coalition may be terminated prior to the host program. In the example above, the extension may be terminated first to determine whether the memory usage has been brought down to an acceptable level. If not, the social network application is then terminated prior to terminating the host program. In one embodiment, a memory usage reduction operation may be performed on the programs based on the priorities or roles of the programs. For example, an idle application may be terminated before terminating a background application, which may be terminated before an extension, a foreground application, an operating system component, and a program launcher in order.

Figure 6:
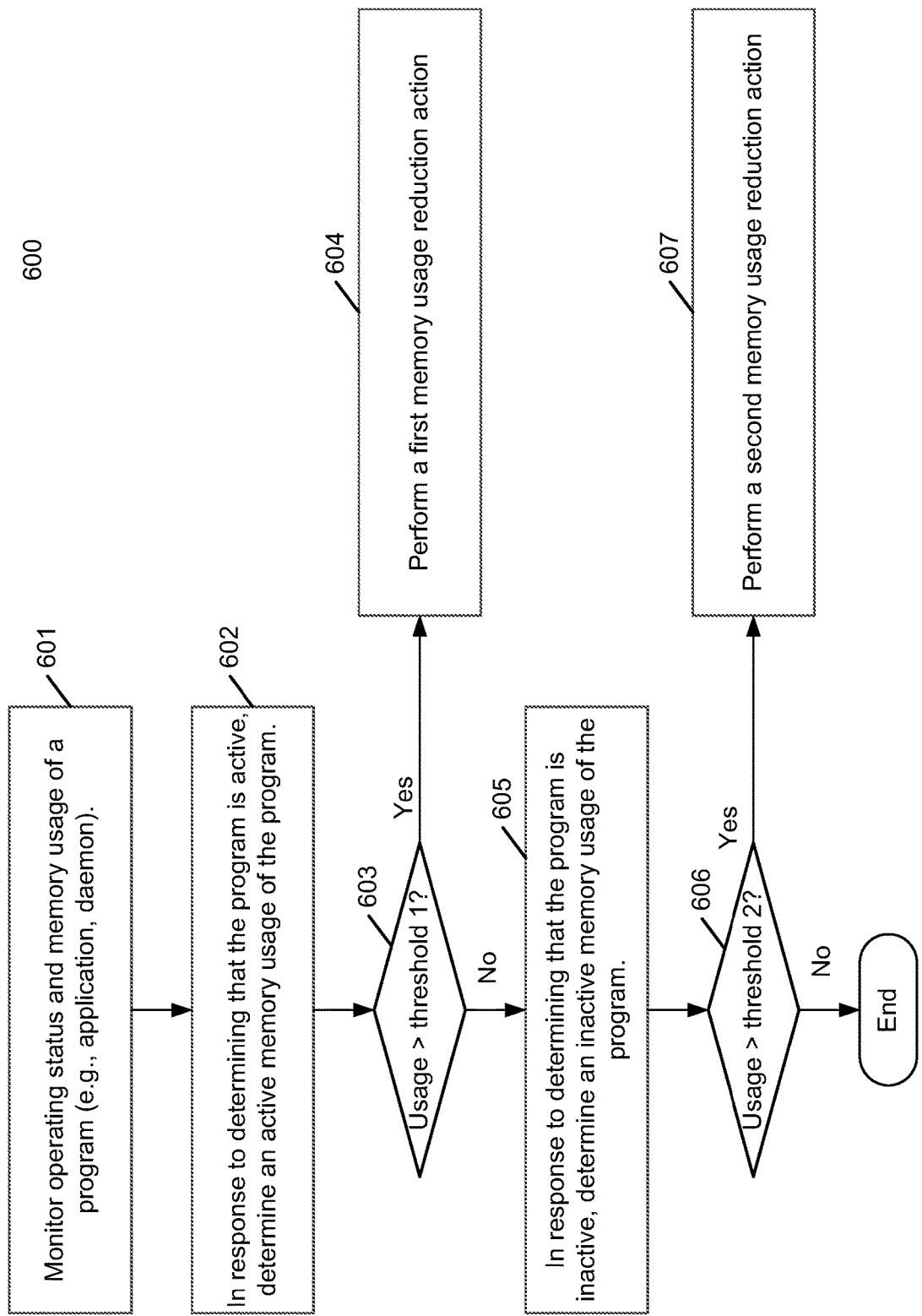
FIG. 6 is a flow diagram illustrating a process for memory management of a data processing system according to one embodiment of the invention.

FIG. 6 is a flow diagram illustrating a process for memory management of a data processing system according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by memory manager 101, memory monitor 102, and/or program state monitor 401 of FIG. 4. Referring to FIG. 6, at block 601, processing logic monitors an operating state and a memory usage of a program. At block 602, in response to determining that the program is active, processing logic determines an active memory usage of the program. At block 603, if it is determined that the active memory usage exceeds a first predetermined threshold, a first memory usage reduction action is performed at block 604. Meanwhile in response to determining that the program is inactive, at block 605, processing logic determines an inactive memory usage of the program. At block 606, if it is determined that the inactive memory usage exceeds a second predetermined threshold, a second memory usage reduction action is performed at block 607.

Referring back to FIG. 4, according to another embodiment of the invention, system 400 further includes timer logic 402 coupled to program state monitor 401 to track the time of certain transactions (e.g., inter-process call (IPC) transaction such as XPC™ transaction of iOS available from Apple Inc.) performed by a program. If a program initiates a predetermined type of transactions, timer logic 402 may be used to track how long the program has been active with respect to that transaction. If the time period exceeds a predetermined threshold, a memory usage reduction action may be performed on the program, such as, for example, forcing the program to transition from an active state to an inactive state. Alternatively, the program may be terminated as described above.

Figure 7:
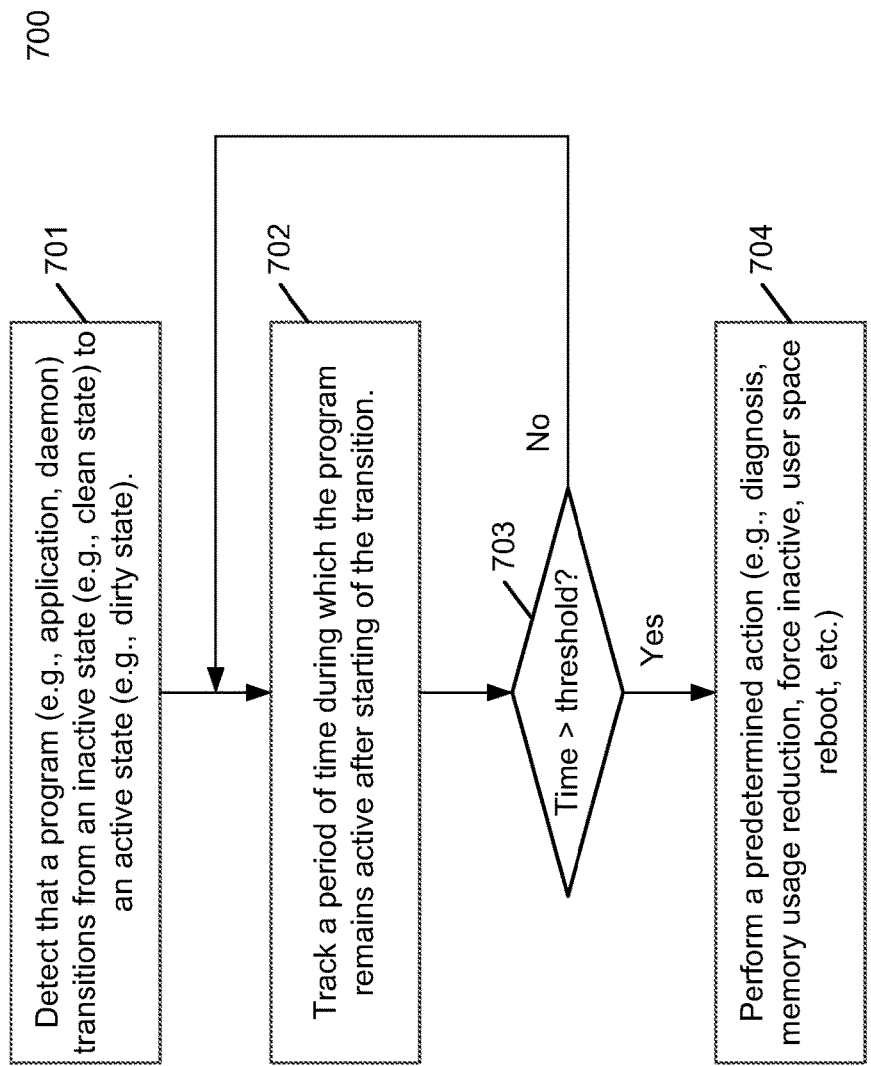
FIG. 7 is a flow diagram illustrating a process for memory management of a data processing system according to one embodiment of the invention.

FIG. 7 is a flow diagram illustrating a process for memory management of a data processing system according to one embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by memory manager 101, memory monitor 102, program state monitor 401, and/or timer logic 402 of FIG. 4. Referring to FIG. 7, at block 701, processing logic detects that a program transitions from an inactive state to an active state, such as, for example, opening an IPC connection with an operating system. At block 702, processing logic tracks a period of time during which the program remains active after starting of the transaction. At block 703, if it is determined the period of time exceeds a predetermined threshold, a predetermined action (e.g., generating a diagnosis report, memory usage reduction operation, forcing the program to be inactive, terminating the program, or user space reboot, etc.) is performed at block 704.

Figure 8:
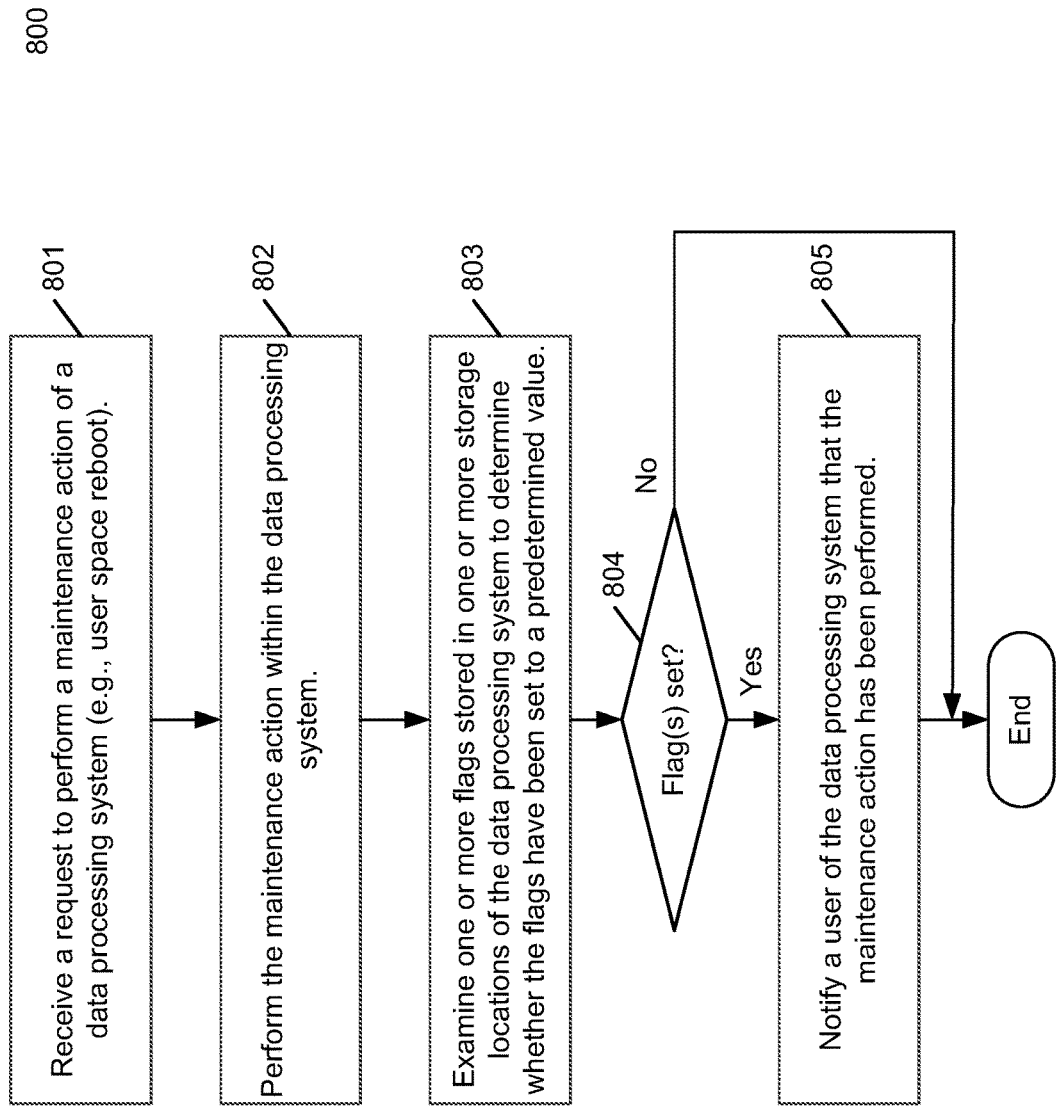
FIG. 8 is a flow diagram illustrating a process for memory management of a data processing system according to one embodiment of the invention.

FIG. 8 is a flow diagram illustrating a process for memory management of a data processing system according to one embodiment of the invention. Process 800 may be performed by processing logic that includes hardware (e.g. circuitry, dedicated logic, etc.), software (e.g., embodied on a non-transitory computer readable medium), or a combination thereof. Referring to FIG. 8, at block 801, processing logic receives a request to perform a maintenance operation for a data processing system (e.g., a reboot while a user is asleep). At block 802, processing logic performs the maintenance operation. At block 803, processing logic examines one or more flags or data structures stored at one or more storage locations of the data processing system to determine whether the flags have been set to a predetermined value. At block 804 if it is determined that the flags have been set to the predetermined value, processing logic notifies a user of the data processing system that the maintenance operation has been performed at block 805.

Note that some or all of the components as shown and described above (e.g., memory manager 101, memory monitor 102, program state monitor 401, and/or timer logic 402) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
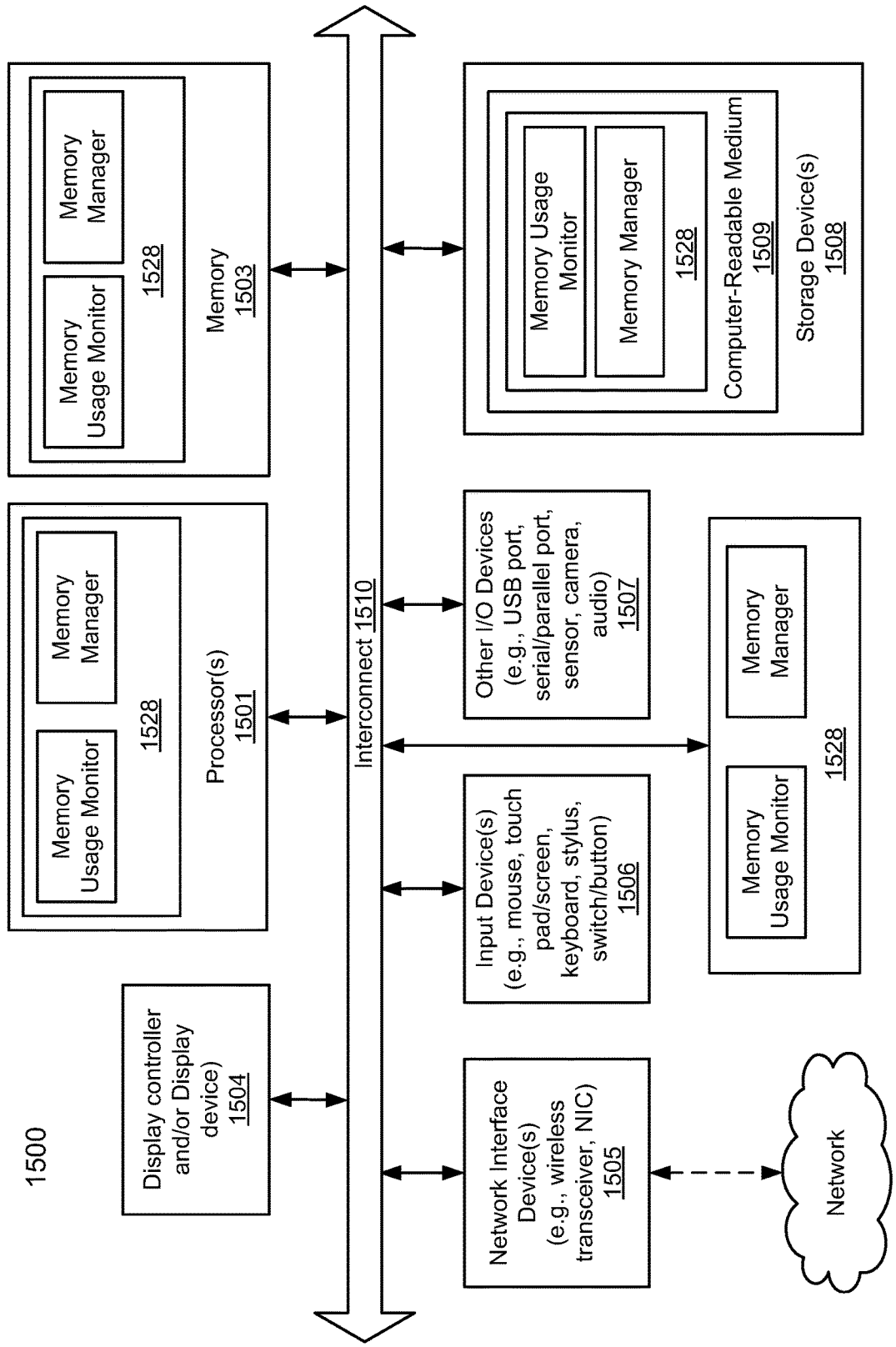
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above, such as, for example, systems 100 and 400 as shown in FIGS. 1 and 4. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein.

Module/unit/logic 1528 may represent any of the components described above, such as, for example, memory manager 101 and memory usage monitor 102 of FIGS. 1 and 4, etc. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine-readable medium having instructions stored therein, which when executed by a data processing system, cause the data processing system to perform a method for memory management, the method comprising:
   monitoring, by a memory usage monitor executed by the data processing system, a memory usage of a program;
   monitoring, by a state monitor executed by the data processing system, an operating state of the program;
   in response to determining that the operating state of the program is an active state and the memory usage of the program exceeds a first predetermined threshold, performing a first memory usage reduction action, wherein when the program is in the active state, the program maintains an inter-process call (IPC) communication session with at least one kernel component of an operating system; and
   in response to determining that the operating state of the program is an inactive state and the memory usage of the program exceeds a second predetermined threshold, performing a second memory usage reduction action.

2. The non-transitory machine-readable medium of claim 1, wherein the method further comprises:
   determining whether the program has a memory leak during the active state and the inactive state based on the memory usage of the program; and
   performing the first memory usage reduction action or the second memory usage reduction action in response to determining that the program has a memory leak.

3. The non-transitory machine-readable medium of claim 1, wherein the method further comprises:
   monitoring a trend of the memory usage of the program when the program is inactive; and
   performing the second memory usage reduction action if the trend of the memory usage is trending higher for a predetermined period of time while the program is inactive.

4. A memory management method comprising:
   monitoring, by a memory usage monitor executed by a data processing system, a memory usage of a program;
   monitoring, by a state monitor executed by the data processing system, an operating state of the program;
   in response to determining that the operating state of the program is an active state and the memory usage of the program exceeds a first predetermined threshold, performing a first memory usage reduction action, wherein when the program is in the active state, the program maintains an inter-process call (IPC) communication session with at least one kernel component of an operating system; and
   in response to determining that the operating state of the program is an inactive state and the memory usage of the program exceeds a second predetermined threshold, performing a second memory usage reduction action.

5. The method of claim 4, wherein the method further comprises:
   determining whether the program has a memory leak during the active state and the inactive state based on the memory usage of the program; and performing the first memory usage reduction action or the second memory usage reduction action in response to determining that the program has a memory leak.

6. The method of claim 4, wherein the method further comprises:
monitoring a trend of the memory usage of the program when the program is inactive; and
performing the second memory usage reduction action if the trend of the memory usage is trending higher for a predetermined period of time while the program is inactive.

7. The method of claim 4, wherein the method further comprises:
monitoring a trend of the memory usage of the program when the program is inactive;
and
performing the second memory usage reduction action if the trend of the memory usage
is trending higher time while the program is inactive.

8. The method of claim 4, wherein the data processing system tracks how long the program remains in the active state after a switch from the inactive state to the active state.

9. A data processing system comprising:
a processing system;
a memory coupled to the processing system, the memory comprising a non-transitory machine-readable medium having instructions stored therein, which when executed by the processing system, cause the processing system to perform a method for memory management, the method comprising:
monitoring, by a memory usage monitor executed by the data processing system, a memory usage of a program;
monitoring, by a state monitor executed by the data processing system, an operating state of the program;
in response to determining that the operating state of the program is an active state and the memory usage of the program exceeds a first predetermined threshold, performing a first memory usage reduction action, wherein when the program is in the active state, the program maintains an inter-process call (IPC) communication session with at least one kernel component of an operating system; and
in response to determining that the operating state of the program is an inactive state and the memory usage of the program exceeds a second predetermined threshold, performing a second memory usage reduction action.

10. The data processing system as in claim 9, wherein the method further comprises:
determining whether the program has a memory leak during the active state and the inactive state based on the memory usage of the program; and
performing the first memory usage reduction action or the second memory usage reduction action in response to determining that the program has a memory leak.

11. The data processing system as in claim 9, wherein the method further comprises:
monitoring a trend of the memory usage of the program when the program is inactive; and
performing the second memory usage reduction action if the trend of the memory usage is trending higher for a predetermined period of time while the program is inactive.

12. The data processing system as in claim 9, wherein the method further comprises:
monitoring a trend of the memory usage of the program when the program is inactive; and
performing the second memory usage reduction action if the trend of the memory usage is trending higher time while the program is inactive.

13. The data processing system as in claim 9 wherein the processing system tracks how long the program remains in the active state after a switch from the inactive state to the active state.

* * * * *